Patented Jan. 26, 1954

2,667,412

UNITED STATES PATENT OFFICE 2,667,412

HERBICIDAL COMPOSITION

David T. Mowry and Arthur H. Schlesinger, Dayton, Ohio, assignors to Monsanto Chemical Company, St. Louis, Mo., a corporation of Delaware No Drawing. Application March 23, 1951,
Serial No. 217,319

5 Claims. (Cl. 71—2.7)

The present invention relates to herbicides and deals more particularly with methods for the general destruction of plants.

A number of herbicides are known, a variety of organic and inorganic compounds having been suggested in the prior art for use as plant killers. Among the disadvantages of known herbicides may be mentioned corrosive effect on equipment, chemical reactivity with other components customarily employed in agricultural sprays or powders, instability when exposed for long periods of time to ordinary atmospheric conditions, and soil instability, e. g., chemical reactivity with soil components and susceptibility to decomposition by soil microorganisms, which results in loss of the active material.

Now we have found that highly stable, valuable herbicides are obtained by employing allyl cyanoacetate as the active ingredient. Allyl cyanoacetate is a known compound which is readily available by reaction of allyl alcohol or allyl chloride with cyanoacetic acid.

Allyl cyanoacetate is an effective herbicide over wide ranges of concentrations. Its effectiveness may be measured by determining the inhibition of root growth as compared to similar untreated plants. The general usefulness of a herbicide may be measured by comparing the concentrations of a herbicide required to produce a certain inhibition of growth on a broad-leafed plant with the concentrations of a herbicide required to produce the same inhibition of growth on a narrow-leafed plant. For evaluation in many laboratories the cucumber has been adopted as a typical broad-leafed dicotyledonous plant for technical reasons, and wheat has been used as a standard narrow-leafed monocotyledonous plant. The general technique of evaluation of herbicides by growing seedlings in petri dishes has been described by Thompson, Swanson and Norman, Botanical Gazette, 107, 476–507 (1946).

The present invention is illustrated, but not limited by the following example:

Example

The herbicidal activity of allyl cyanoacetate and of two standard herbicides, i. e., isopropyl carbanilate and 2,4-dichlorophenoxyacetic acid, was determined by germination of cucumber seeds for 4 days at a temperature of 76° F. in the presence of an aqueous suspension of the cyanoacetate at a concentration of 100 p. p. m. Seventy five seeds were used for the test. The results are expressed as per cent length of the primary roots in the presence of the chemical compared with the length of the primary roots of controls which had been germinated in water.

| Compound Tested | Percent Growth at 100 Parts Per Million |
|---|---|
| Allyl cyanoacetate | 4 |
| Isopropyl Carbanilate | 8 |
| 2,4-Dichlorophenoxyacetic acid | 6 |

The herbicidal efficiency of allyl cyanoacetate is remarkable, because as shown in the table given below neither allyl compounds generally, nor cyano compounds generally, possess great herbicidal efficiency. When tested as described above, aqueous suspensions of a random group of such compounds were found to have the following effects:

| Compound Tested | Percent Growth at 100 Parts Per Million |
|---|---|
| Ethyl α-cyano-p-chlorocinnamate | 75 |
| Furfurylidenecyanoacetamide | 85 |
| Allyl cyanide | 95 |
| Methallyl trichloroacetate | 99 |

Herbicidal compositions containing the allyl cyanoacetate may be oil solutions or oil emulsions of the ester compound. The oil solutions may be obtained simply by dissolving the allyl cyanoacetate in oil in effective proportions. In most instances, however, it is more expedient to prepare oil concentrates of the allyl cyanoacetate, which oil concentrates are diluted by the consumer prior to their use. Dilution of the oil concentrates may be effected by preparing oil-in-water emulsions, i. e., by adding a small quantity of the oil concentrate to a large quantity of water. The oil concentrates may also be used for the preparation of very dilute oil solutions.

Instead of dissolving the allyl cyanoactate in oil, the allyl cyanoacetate may be dissolved in other solvents, and the resulting solutions employed directly as herbicides or employed as concentrates for the preparation of herbicidal aqueous suspensions or dispersions. Solvents which may be used are, e. g., kerosene, hexane, benzene, etc.

Dispersing or emulsifying agents are advantageously employed in the preparation of the present herbicidal suspensions or emulsions.

The allyl cyanoacetate is preferably applied by spraying an aqueous suspension or oil emulsion of the same, this method affording an easy and inexpensive way of destroying plant growth. However, it is likewise effective when applied in agricultural dusts; or it may be used with water-insoluble insecticides, fungicides, etc. in customarily employed organic solutions.

The aqeous suspensions or oil emulsions may be used to destroy already existing plant growth by direct application to the undesirable plants, or they may be employed to prevent the plant growth by application to soils. When employed to prevent plant growth, for example in parking areas, highway abutments, railway yards, etc., it may be applied either as a liquid spray or a dust or it may be admixed with customarily employed temporary surfacing materials, e. g., oils, cinders, etc. The present invention thus provides a generally useful method of preventing and destroying undesirable plant growth.

There may be employed 0.1 part to 20 parts of allyl cyanoacetate per hundred parts by weight of the carrier, and in this manner an acre of land may be freed of plants by application of only a few pounds of the present herbicide.

What we claim is:

1. The method of destroying undesirable plants which comprises treating said plants with a toxic quantity of a herbicidal composition containing allyl cyanoacetate as the active ingredient.

2. The method of destroying undesirable plants which comprises treating said plants with a toxic quantity of an aqueous suspension of allyl cyanoacetate.

3. The method of destroying undesirable plants which comprises treating said plants with a toxic quantity of a herbicidal composition comprising a carrier and allyl cyanoacetate as the active ingredient.

4. A herbicidal composition comprising an aqueous suspension of allyl cyanoacetate, said cyanoacetate being present in said composition in a phytotoxic concentration.

5. A herbicidal composition comprising an oil emulsion of allyl cyanoacetate, said cyanoacetate being present in said composition in a phytotoxic concentration.

DAVID T. MOWRY.
ARTHUR H. SCHLESINGER.

No references cited.